US010635575B2

(12) United States Patent
Oliver et al.

(10) Patent No.: US 10,635,575 B2
(45) Date of Patent: Apr. 28, 2020

(54) TESTING OF ENTERPRISE RESOURCE PLANNING SYSTEMS

(71) Applicant: Basis Technologies International Limited, Surrey (GB)

(72) Inventors: Craig Douglas Oliver, Surrey (GB); Darren John Thorpe, Kent (GB)

(73) Assignee: Basis Technologies International Limited, Surrey (GB)

( * ) Notice: Subject to any disclaimer, the term of this patent is extended or adjusted under 35 U.S.C. 154(b) by 0 days.

(21) Appl. No.: 15/229,904

(22) Filed: Aug. 5, 2016

(65) Prior Publication Data

US 2017/0046249 A1 Feb. 16, 2017

(30) Foreign Application Priority Data

Aug. 12, 2015 (GB) .................................. 1514336.5

(51) Int. Cl.
  *G06F 9/44* (2018.01)
  *G06F 11/36* (2006.01)
  *G06Q 10/06* (2012.01)
  *G06Q 10/10* (2012.01)
  *H04L 29/08* (2006.01)

(52) U.S. Cl.
  CPC ..... *G06F 11/3668* (2013.01); *G06Q 10/0633* (2013.01); *G06Q 10/10* (2013.01); *H04L 67/34* (2013.01)

(58) Field of Classification Search
  CPC .................................................. G06F 11/3668
  USPC ......................................................... 717/124
  See application file for complete search history.

(56) References Cited

U.S. PATENT DOCUMENTS 5,655,081 A * 8/1997 Bonnell .............. G06F 11/0748
  709/202
7,003,560 B1 * 2/2006 Mullen .................. G06Q 10/06
  709/223

(Continued)

FOREIGN PATENT DOCUMENTS

WO  WO2007050345  5/2007
WO  WO2012167190  12/2012

OTHER PUBLICATIONS

GB Search Report dated Feb. 29, 2016 for corresponding GB Patent Application No. 1514336.5, 5 pages.

(Continued)

*Primary Examiner* — Evral E Bodden
(74) *Attorney, Agent, or Firm* — Lee & Hayes, P.C.

(57) ABSTRACT

Application servers, AS, for use in live and test enterprise resource planning, ERP, systems and a test ERP system for testing an update to the live ERP system are described. A system transaction recorder of the live ERP system captures live system transaction data comprising a plurality of live system transaction inputs and a plurality of live system transaction outputs. A receiver of an AS of the test ERP system receives the system transaction data and a system tester applies the plurality of live system transaction inputs to a plurality of test ERP system transactions corresponding to the plurality of system transactions undertaken in the live ERP system, such that a plurality of test system transaction outputs are produced. An error detector determines whether there has been any error in the test ERP system based on the plurality of test system transaction outputs.

20 Claims, 9 Drawing Sheets

(56) References Cited

U.S. PATENT DOCUMENTS

| | | | |
|---|---|---|---|
| 7,197,741 B1 * | 3/2007 | Stapf | G06Q 10/06 |
| | | | 717/102 |
| 7,490,319 B2 * | 2/2009 | Blackwell | G06F 11/3664 |
| | | | 717/124 |
| 8,327,351 B2 * | 12/2012 | Paladino | G06F 8/71 |
| | | | 717/106 |
| 8,510,712 B1 | 8/2013 | Killmar, III | |
| 8,522,083 B1 * | 8/2013 | Cohen | G06F 11/3672 |
| | | | 714/38.1 |
| 8,560,502 B2 * | 10/2013 | Vora | G06F 11/3684 |
| | | | 707/648 |
| 8,751,405 B2 | 6/2014 | Ramaratnam et al. | |
| 2004/0107416 A1 * | 6/2004 | Buban | G06F 8/67 |
| | | | 717/170 |
| 2007/0180325 A1 | 8/2007 | Bailey et al. | |
| 2009/0240765 A1 * | 9/2009 | Wiles, Jr. | G06F 11/3414 |
| | | | 709/203 |
| 2014/0032637 A1 | 1/2014 | Weir | |

OTHER PUBLICATIONS

EP Exmaination Report for corresponding EP Patent Application No. 16181885.1 dated Sep. 17, 2018; 7 pages.

* cited by examiner

TESTING OF ENTERPRISE RESOURCE PLANNING SYSTEMS

This Application claims priority to UK Patent Application No. 1514336.5, filed 12 Aug. 2015, which is incorporated herein by reference.

TECHNICAL FIELD

The invention relates to testing of Enterprise Resource Planning (ERP) systems.

BACKGROUND

An ERP system 100 may comprise a three tier architecture, as shown in FIG. 1. The ERP system 100 comprises a database server 102, a plurality of application servers (AS) 104a-c and a plurality of user devices or terminals 106a-f.

An ERP system may, for example, be a Systems, Applications and Products in Data Systems (SAP®) system. Other terms may be encompassed by an ERP system, as used herein, such as an Enterprise Planning Management System, an Enterprise Management System, an Enterprise Software system and an Enterprise Application Software system.

The database server 102 is in data communication with the ASs 104a-c and the ASs 104a-c are in data communication with the user devices 106a-f. FIG. 1 shows only a single database server 102, however there may be multiple database servers 102 in an ERP system. Similarly, FIG. 1 shows a specific number of ASs 104a-c and user devices 106a-f, but this will be understood to be illustrative only and there may be any number of ASs 104a-c and/or user devices 106a-f.

The user devices 106a-f are configured to display an ERP system front-end to the users enabling them to interact with the ERP system. Typically, the ASs 104a-c are remotely located with respect to the user devices 106a-f. The ASs 104a-c are configured to receive user requests entered via the front-end and to process those requests using application logic, such that they can be passed to the database server 102. The ASs 104a-c are further configured to read data from the database server 102, process that data using application logic and pass the processed data to the user devices 106a-f for presentation to a user. The ASs 104a-c are configured to write data to the database server 102 and/or to read data from the database server 102, which stores data relating to the ERP system. Data communications between the database server 102, the ASs 104a-c and the user devices 106a-f may be over a computer network, such as an internet, intranet or the Internet. Such data communications may be wired, wireless or a combination of both.

When making changes or updates to an ERP system, it is necessary to test those changes or updates before they are implemented on the ERP system. It is noted that an update to an ERP system relates to updates of the operation of the system, such as updates to the system logic and not merely to an update of data held in the database 102. Testing updates to the ERP system reduces the risk of any bugs or errors in the changes or updates corrupting the data stored in the ERP system. As part of that process, different systems can be defined, as shown in FIG. 2. A "development" system 200 may be defined as a system in which software engineers are able to develop new routines and code to implement the changes or updates. Further, a "test" system 202 may be defined as a system in which the developed changes or updates may be tested before being implemented in a "live" (or "production") system 204, which is the operational ERP system 100. FIG. 2 shows the progression of the changes or updates through the three systems 200, 202, 204 defined.

Each of the development system 200, the test system 202 and the live system 204 may comprise the features of the ERP system 100 shown in FIG. 1. The development system 200 and the test system 202 may be a representation of the live system 204 at a particular time.

The development system 200 will undergo low level testing and debugging by the software engineering team developing the changes or updates to be implemented. The test system 202 may be subjected to a plurality of more detailed user operations that may be undertaken by a specific user or users to determine whether there are any bugs or errors in the changes or updates. This process may involve a number of users devoting a set period of time, such as one or more days, to testing the system. These users are therefore taken away from their normal duties during that time. In addition, testing scenarios are determined so that the users can run through operations in order to test the test system 202, but these inevitably do not represent a full test of the test system, as they only test those operations that a developer of the testing scenarios is able to think of.

SUMMARY

Exemplary embodiments of the invention may be directed to solving one or more problems highlighted above. In particular, exemplary embodiments of the invention may provide testing methods that allow a test system to be tested based on activity on a separate ERP system, e.g. the live system.

According to the invention in one aspect, there is provided an apparatus for use as an application server in a test enterprise resource planning, ERP, system, the apparatus comprising: a receiver configured to receive operation data from a further apparatus for use as an application server in a live ERP system, the received operation data relating to one or more ERP system operations undertaken on the live ERP system; and system tester configured to undertake the one or more ERP system operations in the test ERP system.

Optionally, the apparatus further comprises an error detector configured to determine whether any errors have occurred in the test ERP system when undertaking the one or more ERP system operations.

Optionally, the error detector is configured to compare the data stored in a database server of the test system with data stored in the live ERP system.

Optionally, the error detector is configured to compare the data stored in a database server of the test system with predicted live ERP system data.

Optionally, the predicted data is based on the one or more ERP system operations and data stored in the database server of the test ERP system before undertaking the one or more ERP system operations.

Optionally, the receiver is further configured to receive from the further apparatus data indicating the data stored on the database server of the live ERP system after the one or more ERP operations have been undertaken on the live ERP system.

Optionally, the error detector is configured to control a transmitter to transmit data indicating whether any errors are detected in the test ERP system.

Optionally, the receiver is further configured to receive from the further node system data indicating all or part of the data stored on a database server of the live ERP system, the apparatus further comprising a system tester configured to load the received system data into a database server of the test ERP system.

According to the invention in another aspect, there is provided a method for an apparatus for use as an application server in a test enterprise resource management, ERP, system, the method comprising: receiving, by a receiver, operation data from a further apparatus for use as an application server in a live ERP system, the received operation data relating to one or more ERP system operations undertaken on the live ERP system; and undertaking, by a system tester, the one or more ERP system operations in the test ERP system.

Optionally, an error detector determines whether any errors have occurred in the test ERP system when undertaking the one or more ERP system operations.

Optionally, determining whether any errors have occurred comprises comparing the data stored in a database server of the test system with data stored on the live ERP system.

Optionally, the error detector is configured to compare the data stored in a database server of the test system with predicted live ERP system data.

Optionally, the predicted data is based on the one or more ERP system operations and data stored in the database server of the test ERP system before undertaking the one or more ERP system operations.

Optionally, the receiver receives from the further apparatus, data indicating the data stored on the database server of the live ERP system after the one or more ERP operations have been undertaken on the live ERP system.

Optionally, the error detector controls a transmitter to transmit data indicating whether any errors are detected in the test ERP system.

Optionally, the receiver receives from the further node system data indicating all or part of the data stored on a database server of the live ERP system, and loading, by a system tester, the received system data into a database server of the test ERP system.

According to the invention in another aspect, there is provided a computer program comprising instructions which, when executed on at least one processor, cause the at least one processor to carry out the method described above and herein.

According to the invention in another aspect, there is provided a carrier containing the computer program above, wherein the carrier is one of an electronic signal, optical signal, radio signal, or non-transitory computer readable storage medium.

According to the invention in another aspect, there is provided an apparatus for use as an application server of a live enterprise resource management, ERP, system, the apparatus comprising: a receiver configured to receive ERP system messages from one of a user device and a database server of the live ERP system, the received ERP system messages comprising data indicating operations to be undertaken on the live ERP system; and a test agent configured to monitor the ERP system messages and further configured to control a transmitter to transmit one or more of the received ERP system messages to a further apparatus for use as an application server in a test ERP system, the test ERP system comprising updated functionality with respect to the live ERP system.

Optionally, the apparatus further comprises a system downloader configured to retrieve all or part of the data stored on the database server, and further configured to transmit the retrieved data to the further apparatus.

According to the invention in another aspect, there is provided a method for use in an apparatus for use as an application server of a live enterprise resource management, ERP, system, the method comprising: receiving, by a receiver, ERP system messages from one of a user device and a database server of the live ERP system, the received ERP system messages comprising data indicating operations to be undertaken on the live ERP system; monitoring, by a test agent, the ERP system messages; and controlling, by the test agent, a transmitter to transmit one or more of the received ERP system messages to a further apparatus for use as an application server in a test ERP system, the test ERP system comprising updated functionality with respect to the live ERP system.

Optionally, a system downloader retrieves all or part of the data stored on the database server and further transmitting the retrieved data to the further apparatus.

According to the invention in another aspect, there is provided an application server for use in a test enterprise resource planning, ERP, system, the test ERP system for testing an update to a live ERP system and comprising a system copy of a live ERP system and an update to the live ERP system, the application server comprising: a receiver configured to receive system transaction data from a live ERP system, the system transaction data comprising a plurality of live system transaction inputs and a plurality of live system transaction outputs for a plurality of system transactions undertaken on the live ERP system; a system tester configured to apply the plurality of live system transaction inputs to a plurality of test system transactions corresponding to the plurality of system transactions undertaken in the live ERP system, such that a plurality of test system transaction outputs are produced; and an error detector configured to determine whether there has been any error in the test ERP system based on the plurality of test system transaction outputs.

Optionally, the error detector is configured to determine a plurality of predicted test system transaction outputs based on the plurality of live system transaction inputs and the update to the live ERP system, and to determine whether there has been any error by comparing the plurality of test system transaction outputs to the plurality of predicted test system transaction outputs.

Optionally, the error detector is configured to determine whether there has been any error by comparing the plurality of test system transaction outputs to the plurality of live system transaction outputs.

Optionally, the system tester is configured to apply the live system transaction inputs in the order in which they were undertaken on the live ERP system.

Optionally, the error detector is configured to control a transmitter to transmit an error message if any errors are detected in the test ERP system.

Optionally, the plurality of system transactions undertaken on the live ERP system were undertaken during a specified time period.

Optionally, the system transaction data comprises live system transaction inputs and live system transaction outputs for less than 100% of the system transactions undertaken on the live ERP system during the specified time period.

Optionally, the receiver is further configured to receive system operation data comprising system operations undertaken during one or more of the system transactions undertaken on the live ERP system, and wherein the system tester is configured, based on the received system operation data, to undertake on the test ERP system a test system transaction for one or more live system transactions for which system transaction data has not been received.

Optionally, the system tester is further configured to undertake the test system transaction by implementing the system operations relating to the live system transaction.

Optionally, the system transaction data further comprises correlation data indicating whether there is a correlation between the live ERP system and a further live ERP system whereby a live system transaction of the live ERP system calls a further live system transaction in the further live ERP system, the system tester being further configured not to apply the system transaction data to one of a test system transaction corresponding to the live system transaction and a further test system transaction corresponding to the further live system transaction.

Optionally, the test ERP system comprises a plurality of merged live ERP systems, and wherein the receiver is configured to receive system transaction data from the plurality of live ERP systems, the application server further comprising a synchroniser configured to ensure the system transaction data is in chronological order before application by the system tester.

According to the invention in another aspect, there is provided a method for operation of an application server for use in a test enterprise resource planning, ERP, system, the test ERP system for testing an update to a live ERP system and comprising a system copy of a live ERP system and an update to the live ERP system, the method comprising: receiving, by a receiver, system transaction data from a live ERP system, the system transaction data comprising a plurality of live system transaction inputs and a plurality of live system transaction outputs for a plurality of system transactions undertaken on the live ERP system; applying, by a system tester, the plurality of live system transaction inputs to a plurality of test system transactions corresponding to the plurality of system transactions undertaken in the live ERP system, such that a plurality of test system transaction outputs are produced; and determining, by an error detector, whether there has been any error in the test ERP system based on the plurality of test system transaction outputs.

Optionally, the error detector determines a plurality of predicted test system transaction outputs based on the plurality of live system transaction inputs and the update to the live ERP system, and determines whether there has been any error by comparing the plurality of test system transaction outputs to the plurality of predicted test system transaction outputs.

Optionally, the error detector determines whether there has been any error by comparing the plurality of test system transaction outputs to the plurality of live system transaction outputs.

Optionally, the system tester applies the live system transaction inputs in the order in which they were undertaken on the live ERP system.

Optionally, the error detector controls a transmitter to transmit an error message if any errors are detected in the test ERP system.

Optionally, the plurality of system transactions undertaken on the live ERP system were undertaken during a specified time period.

Optionally, the system transaction data comprises live system transaction inputs and live system transaction outputs for less than 100% of the system transactions undertaken on the live ERP system during the specified time period.

Optionally, the receiver receives system operation data comprising system operations undertaken during one or more of the system transactions undertaken on the live ERP system, and wherein the system tester, based on the received system operation data, undertakes on the test ERP system a test system transaction for one or more live system transactions for which system transaction data has not been received.

Optionally, the system tester undertakes the test system transaction by implementing the system operations relating to the live system transaction.

Optionally, the system transaction data further comprises correlation data indicating whether there is a correlation between the live ERP system and a further live ERP system whereby a live system transaction of the live ERP system calls a further live system transaction in the further live ERP system, and the system tester does not apply the system transaction data to one of a test system transaction corresponding to the live system transaction and a further test system transaction corresponding to the further live system transaction.

Optionally, the test ERP system comprises a plurality of merged live ERP systems, and wherein the receiver receives system transaction data from the plurality of live ERP systems, the method further comprising ensuring, by a synchroniser, that the system transaction data is in chronological order before application by the system tester.

According to the invention in another aspect, there is provided an application server for use in a live enterprise resource planning, ERP, system, the application server comprising: a system transaction recorder configured to capture live system transaction data relating to a plurality of system transactions undertaken in the live ERP system, the live system transaction data comprising a plurality of live system transaction inputs and a plurality of live system transaction outputs; and a transmitter configured to transmit the live system transaction data to an application server in a test ERP system, the test ERP system for testing an update to a live ERP system and comprising a system copy of a live ERP system and an update to the live ERP system.

Optionally, the application server further comprises a system copier configured to capture a system copy of the live ERP system, and wherein the transmitter is further configured to transmit the system copy to the test ERP system.

Optionally, the system transaction recorder is configured to capture live system transaction data during a specified period of time.

Optionally, the system transaction data comprises live system transaction inputs and live system transaction outputs for less than 100% of the system transactions undertaken on the live ERP system during the specified time period.

Optionally, the application server further comprises an operation recorder configured to capture operation data comprising system operations undertaken during one or more of the system transactions undertaken on the live ERP system, and wherein the transmitter is configured to transmit the system operation data to the application server of the test ERP system.

Optionally, the system transaction recorder is configured such that it is triggered to capture the live system transaction data when a user and/or third party system interacts with the live ERP system.

Optionally, the system transaction recorder is further configured to capture correlation data indicating whether there is a correlation between the live ERP system and a further live ERP system whereby a live system transaction of the live ERP system calls a further live system transaction in the further live ERP system.

According to the invention in another aspect, there is provided a method for operating an application server for use in a live enterprise resource planning, ERP, system, the method comprising: capturing, by a system transaction recorder, live system transaction data relating to a plurality of system transactions undertaken in the live ERP system, the live system transaction data comprising a plurality of live system transaction inputs and a plurality of live system transaction outputs; and transmitting, by a transmitter, the live system transaction data to an application server in a test ERP system, the test ERP system for testing an update to a live ERP system and comprising a system copy of a live ERP system and an update to the live ERP system.

Optionally, the method further comprises a system copier capturing a system copy of the live ERP system, and the transmitter transmitting the system copy to the test ERP system.

Optionally, the system transaction recorder captures live system transaction data during a specified period of time.

Optionally, the system transaction data comprises live system transaction inputs and live system transaction outputs for less than 100% of the system transactions undertaken on the live ERP system during the specified time period.

Optionally, the method further comprises capturing, by an operation recorder, operation data comprising system operations undertaken during one or more of the system transactions undertaken on the live ERP system, and transmitting, by the transmitter, the system operation data to the application server of the test ERP system.

Optionally, the system transaction recorder is triggered to capture the live system transaction data when a user and/or third party system interacts with the live ERP system.

Optionally, the system transaction recorder further captures correlation data indicating whether there is a correlation between the live ERP system and a further live ERP system whereby a live system transaction of the live ERP system calls a further live system transaction in the further live ERP system.

According to the invention in another aspect, there is provided a computer program comprising instructions which, when executed on at least one processor, cause the at least one processor to carry any method described above and/or herein.

According to the invention in another aspect, there is provided a carrier containing the computer program described above, wherein the carrier is one of an electronic signal, optical signal, radio signal, or non-transitory computer readable storage medium.

BRIEF DESCRIPTION OF THE DRAWINGS

Exemplary embodiments of the invention are disclosed herein with reference to the accompanying drawings, in which.

DETAILED DESCRIPTION

Generally, disclosed herein are methods and apparatus for testing updates and/or changes to a first ERP system, such as a live ERP system. The updates and/or changes may be embodied in a test ERP system. The test ERP system may be tested using data obtained from a corresponding first ERP system, such as the live ERP system into which the updates and/or changes are intended to be implemented. For example, one or more ERP system transactions undertaken by live users of the live ERP system may be applied in the test ERP system.

The inventors have appreciated that for large ERP systems incorporating a high volume of transactions over time, capturing a complete set of data that relates to each system transaction undertaken in the live ERP system 204 would impact on the performance of the live ERP system 204. That is, the processing capability of the ASs 104*a-c* in the live ERP system would be taken up with monitoring, recording and transmitting system transaction data to the test system 202. Therefore, less processing capability of the ASs 104*a-c* would be available for actually processing the system transactions and this may lead to unacceptable delays in transaction execution. In certain cases these delays may be noticeable to the end user, thus effecting production performance of the live ERP system 204.

In exemplary methods and apparatus, within a specified time, live system transaction inputs and outputs are recorded in the live ERP system and transmitted to the test ERP system 204. In exemplary methods and apparatus, a specified percentage of live system transactions are monitored, recorded and transmitted to the test ERP system 204 and may be used to allow the test ERP system 202 to undertake the plurality of test system transactions corresponding to those undertaken by the live ERP system 204.

The inventors have also appreciated that testing the test ERP system 202 using actual live system transactions conducted on the live ERP system 204 reduces or removes the involvement of users assigned to test the updates and/or changes to a live ERP system 204. In addition, replicating system transactions conducted on the live ERP system 204 results in a more complete test of the test ERP system 202, as there may be a large number of users engaging in system transactions in a large number of locations. This can lead to fewer errors in the updates and/or changes after implementation in the live ERP system 202.

Figure 1:
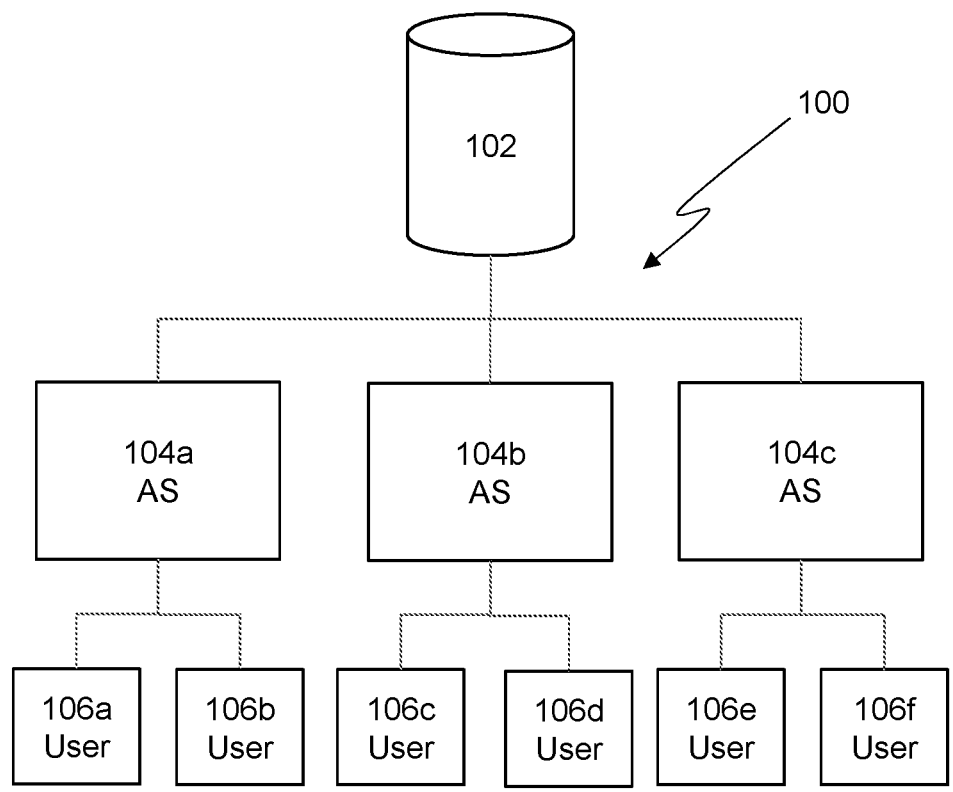
FIG. 1 is an architecture diagram of an ERP system.
Figure 2:
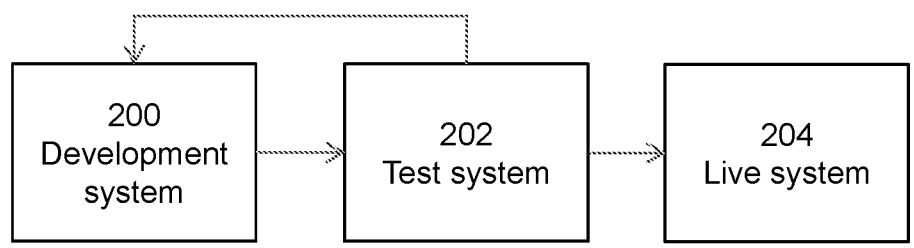
FIG. 2 is a block schematic diagram showing different ERP systems utilised when updating or changing an ERP system.
Figure 3:
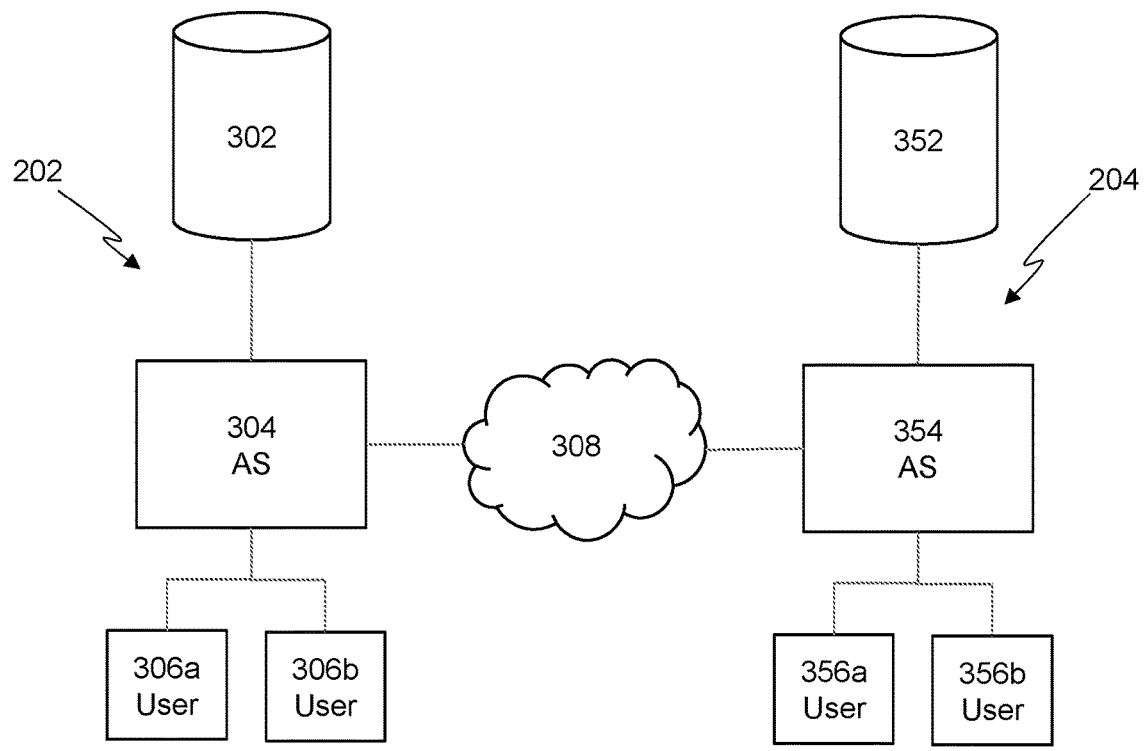
FIG. 3 is an architecture diagram showing a live ERP system and a test ERP system.

FIG. 3 shows a test ERP system 202 and a live ERP system 204. The test and live ERP systems 202, 204 each comprise: a database server 302, 352; an AS 304, 354; and two user devices 306*a-b*, 356*a-b*. It is noted that in exemplary ERP systems, each of the test and live systems 202, 204 may comprise a plurality of database servers 302, 352, a plurality of ASs 304, 354 and any number of user devices 306a-b, 356a-b. In exemplary test and live ERP systems 202, 204, there may be a large number of user devices 306a-b, 356a-b in the hundreds or thousands and there may be tens or hundreds of ASs 304, 354.

The AS 304 of the test ERP system 202 is in data communication with the AS 354 of the live ERP system 204. The data communications between the AS 304 and the AS 354 is shown in FIG. 3 as being over a network 308, but any other type of data communications link is also suitable. In addition, in exemplary test and live ERP systems 202, 204 the user devices 306a-b, 356a-b, ASs 304, 354 and database servers 302, 352 may be in data communications with one or more other elements of the ERP system over a network, such as the network 308. FIG. 3 shows direct communications links between the elements of each of the test and live ERP systems for clarity.

Figure 4:
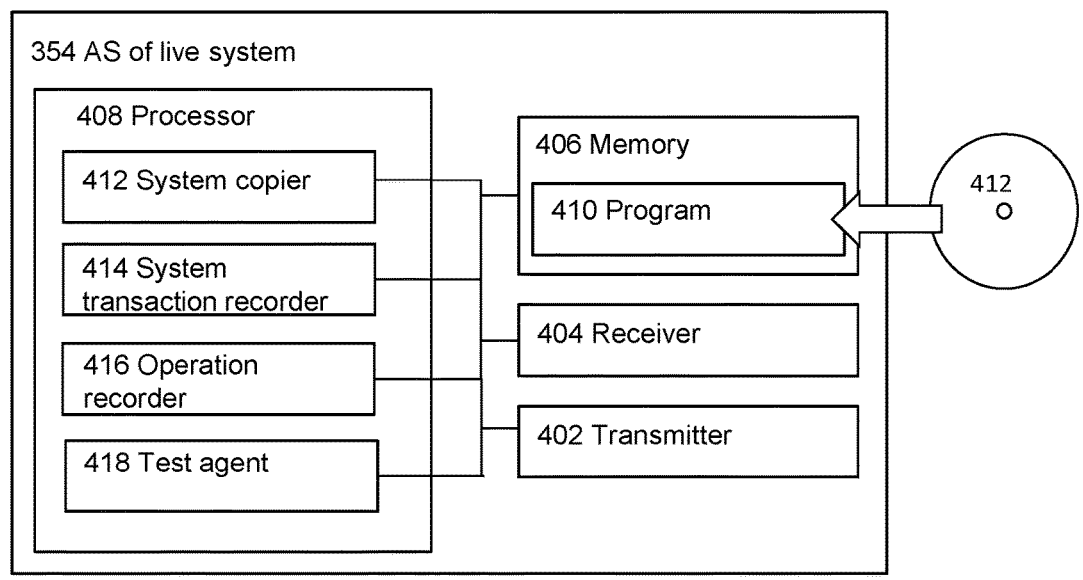
FIG. 4 is a block schematic diagram showing an AS of a live ERP system.

FIG. 4 shows a schematic representation of an AS 354 of the live ERP system 204. The AS 354 comprises a transmitter 402 and a receiver 404. The transmitter 402 and receiver 404 may be in data communication with other ERP system entities such as user devices, databases and ASs in the live ERP system 204 or in other ERP systems, such as the test ERP system 202, and are configured to transmit and receive data accordingly.

The AS 354 further comprises a memory 406 and a processor 408. The memory 406 may comprise a non-volatile memory and/or a volatile memory. The memory 406 may have a computer program 410 stored therein. The computer program 410 may be configured to undertake the methods disclosed herein. The computer program 410 may be loaded in the memory 406 from a non-transitory computer readable medium 412, on which the computer program is stored. The processor 408 is configured to undertake one or more of the functions of a system copier 412, a system transaction recorder 414, an operation recorder 416 and a test agent 418, as set out below.

Each of the transmitter 402 and receiver 404, memory 406, processor 408, system copier 412, system transaction recorder 414, operation recorder 416 and test agent 418 is in data communication with the other features 402, 404, 406, 408, 410, 412, 414, 416, 418 of the AS 354. The AS 354 can be implemented as a combination of computer hardware and software. In particular, the system copier 412, system transaction recorder 414, operation recorder 416 and test agent 418 may be implemented as software configured to run on the processor 408. The memory 406 stores the various programs/executable files that are implemented by a processor 408, and also provides a storage unit for any required data. The programs/executable files stored in the memory 406, and implemented by the processor 408, can include the system copier 412, system transaction recorder 414, operation recorder 416 and test agent 418, but are not limited to such.

Figure 5:
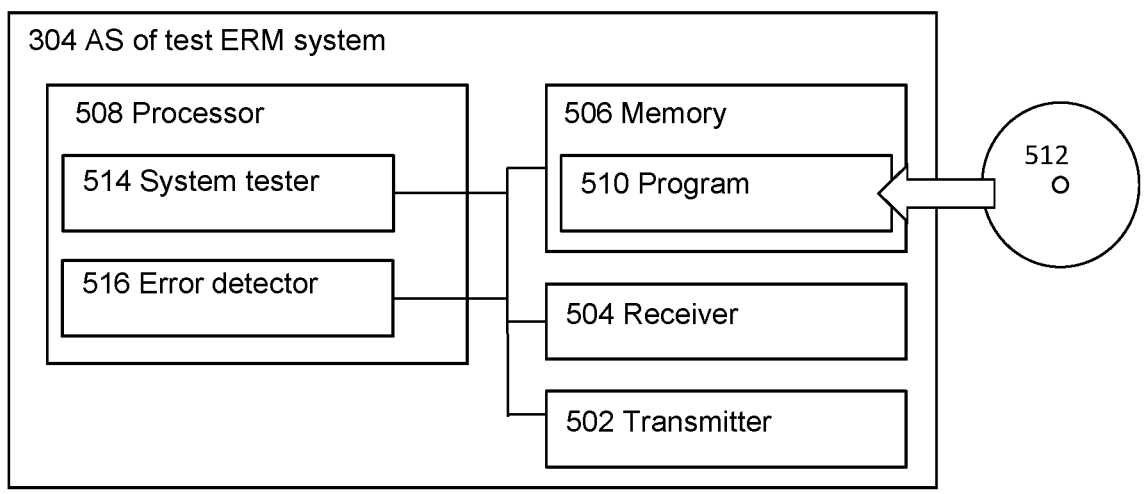
FIG. 5 is a block schematic diagram showing an AS of a test ERP system.

FIG. 5 shows a schematic representation of an AS 304 of the test system 202. The AS 304 comprises a transmitter 502 and a receiver 504. The transmitter 502 and receiver 504 may be in data communication with other ERP system entities such as user devices, databases and ASs in the test ERP system 202 or in other ERP systems, such as the live ERP system 204, and are configured to transmit and receive data accordingly.

The AS 304 further comprises a memory 506 and a processor 508. The memory 506 may comprise a non-volatile memory and/or a volatile memory. The memory 506 may have a computer program 510 stored therein. The computer program 510 may be configured to undertake the methods disclosed herein. The computer program 510 may be loaded in the memory 506 from a non-transitory computer readable medium 512, on which the computer program is stored. The processor 508 is configured to undertake one or more of the functions of a system tester 514 and an error detector 516, as set out below.

Each of the transmitter 502 and receiver 504, memory 506, processor 508, system tester 514 and error detector 516 is in data communication with the other features 502, 504, 506, 508, 510, 514, 516 of the AS 304. The AS 304 can be implemented as a combination of computer hardware and software. In particular, the system tester 514 and error detector 516 may be implemented as software configured to run on the processor 508. The memory 506 stores the various programs/executable files that are implemented by a processor 508, and also provides a storage unit for any required data. The programs/executable files stored in the memory 506, and implemented by the processor 508, can include the system tester 514 and error detector 516, but are not limited to such.

It should be understood that the term "live" ERP system is used throughout this document to refer to any system on which a user of third party system is directly interacting with the ERP system. As such a "live" ERP system as used in this spec may encompass a test ERP system on which a test analyst is undertaking system transactions.

Figure 6:
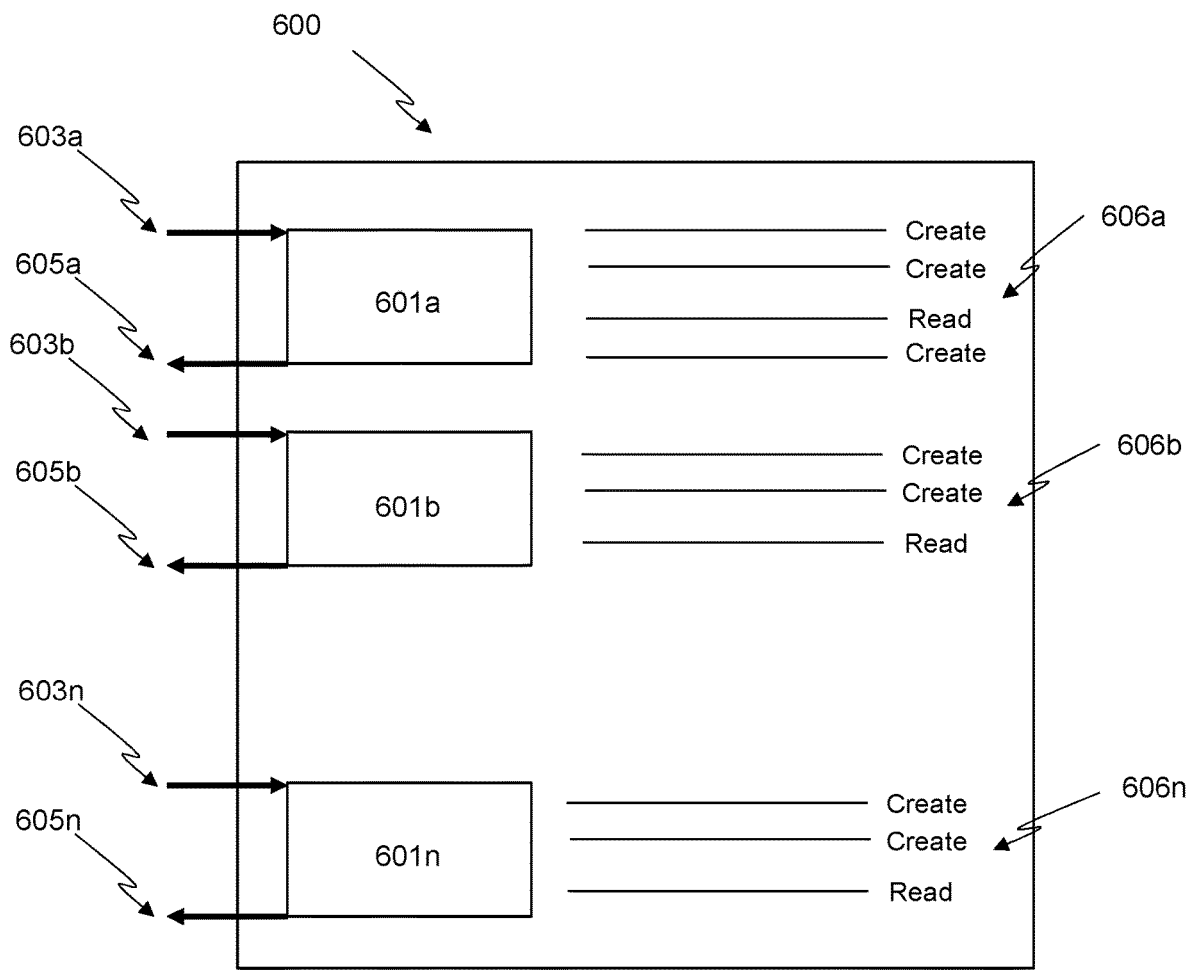
FIG. 6 shows a schematic representation of a business transaction undertaken in a live ERP system.

The term "system transaction" encompasses one of a plurality of transactions performed by an ERP system 204 to complete a business transaction 600, as shown in FIG. 6. A business transaction 600, which may, for example, be a purchase, a sale, an order, taking on of a new customer etc. To complete the business transaction 600, a plurality of system transactions 601a-n may take place. For example, in a business transaction of a customer purchasing a mobile telephone, the first system transaction 601a may involve checking whether the mobile phone is in stock, the second system transaction 601b may involve the preparation of the mobile phone for delivery to the user and a third system transaction 601n may involve the mobile phone being dispatched to the user. System transactions 601a-n may be triggered by a user or by the ERP system itself. It should be understood that a business transaction 600 may comprise any number or type of system transactions 601a-n and the above is an example used for illustrative purposes.

Each system transaction 601a-n may have an input, 603a-n, and an output 605a-n. Further, each system transaction 601a-n may comprise a plurality of "system operations" performed within the ERP system to complete the particular system transaction 601a-n. Each of the operations may encompass any one of a create, read, update and delete (CRUD) operation, as shown by 606a-n. It should be understood each system transaction 601a-n could include any number, sequence and combination of CRUD operations 606a-n, and these may differ for each system transaction 601a-n. Further, the number, sequence and combination of CRUD operations 606a-n is not dependent on the particular type of system transaction 601a-n. That is, for the system transaction 601a of checking whether a mobile phone is in stock, the ERP system will not always perform the same number, sequence or combination of CRUD operations to complete the system transaction 601a. There are several combinations of CRUD operations that could be performed within the ERP system to complete the system transaction 601a of checking whether a mobile phone is in stock. The operations shown in FIG. 6 are for illustrative purposes only.

Figure 7:
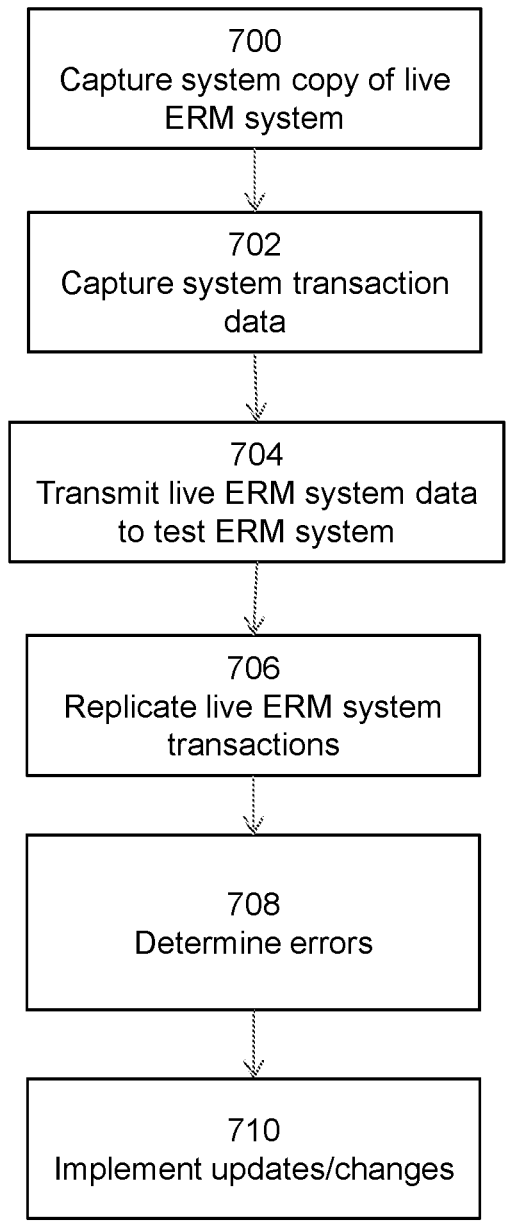
FIG. 7 shows a flow diagram of a method for testing a test ERP system.

FIG. 7 shows an exemplary flow diagram of a method for testing the updates embodied in the test ERP system 202.

700: The system copier 412 captures a system copy of the live ERP system 204. The system copy of the live ERP system 204 may comprise the application logic of the live ERP system 204 and the database 302 of the live ERP system. The system copy may be transmitted to the test ERP system 202 by the transmitter 402 of the AS 354 of the live ERP system 204. In other exemplary methods and apparatus, the system copy may be loaded onto a data storage medium and then transferred to the test ERP system 202.

702: Users of the live ERP system 204 undertake business transactions 600 and/or system transactions 601*a-n* in the live ERP system 204 in the normal way. This may involve user requests being transmitted from the user devices 356*a-b* to the AS 354 for processing and the AS 354 transmitting data to the data server 352 to make any necessary update to the data stored thereon. Data may also be retrieved from the data server 352 and transmitted to the user devices 356*a-b*.

The system transaction recorder 414 captures live system transaction data relating to the system transactions undertaken by the user on the live ERP system 204. This may begin immediately after the system copier 412 has captured 700 the system copy or alternatively a period of time before the system copier 412 has captured 700 the system copy, which allows the system transaction recorder 414 to record in full any system transactions that are on-going at the time the system copy is made.

The data captured by the system transaction recorder 414 may comprise live system transaction inputs and live system transaction outputs for the system transactions undertaken by the live ERP system 204. The system transaction recorder 414 may capture data relating to the live system transaction inputs and outputs during a specified period of time, t. That is, the system transaction recorder 414 may capture every user or third party system interaction with the live ERP system 204 and store it as a live system transaction input. Further, the system transaction recorder 414 may capture the result of every user or third party system interaction with the live ERP system 204 and store it as a live system transaction output.

The system transaction recorder 414 may be configured to capture system transaction data during a specified period of time, t. This period of time, t, may be user definable or may be dynamically defined based on, for example, the size of the system or the number of system transactions expected to be undertaken by the live ERP system 204. In the exemplary method of FIG. 7, the system transaction recorder captures the inputs and outputs for every system transaction undertaken by the live ERP system 204 within the specified recording time, t.

704: In exemplary methods and apparatus, live ERM system data, comprising the system copy and the captured system transaction data, is transmitted to the test ERP system 202. The live ERM system data is received by the system tester 514 of the AS 304 in the test ERP system 202. The system tester 514 may then store the live ERM system data. The data stored on the database 352 of the live system 204 is stored in the database server 302 of the test ERM system 202. The system logic and system transaction data is stored in the memory 506 such that all or part of the live ERP system transactions undertaken on the live ERP system 204 within the specified time period, t, may be undertaken in the test ERP system. The system copy and/or the system transaction data may be transferred to a data storage medium and loaded into the test system 202 manually.

706: The system tester 514 of the AS 304 of the test ERP system 202 undertakes in the test ERP system 202 the ERP system transaction(s) captured in the live ERP system 204 during the specified time period, t. The system tester 514 may be configured to apply a live system transaction input captured by the system transaction recorder 414 to a system transaction of the test ERP system 202. The test ERP system 202 may undertake the system transaction based on the applied live system transaction input and the system logic in the system copy. The test ERP system 202 then produces a test ERP system transaction output as a result of undertaking the system transaction. The test ERP system transaction outputs may be stored in the database 302 of the test ERP system 202.

It is noted that the system tester 514 applies the live system transaction inputs and outputs captured by the system transaction recorder 414 in the order in which they were undertaken in the live ERP system 204. However, the precise timing of the system transactions may not need to be observed so long as the order is correct. To facilitate this, the system transaction data may be time-stamped by the system transaction recorder 414 to indicate the time at which the system transaction was undertaken in the live ERP system 204.

708: The error detector 516 may determine whether there has been any error in the test ERP system as a result of undertaking the ERP system transactions. The error detector 516 may receive the test system transaction outputs. In exemplary methods and apparatus, the error detector 516 may be configured to compare the live system transaction outputs captured by the system transaction recorder 414 with the test system transaction outputs. In other exemplary methods and apparatus, the error detector 516 may be configured to compare all or part of the data stored in the test ERP system 202 after one or more system transactions have been undertaken in the test system 202 with corresponding data stored in the live ERP system 204 after system transactions have been undertaken in the live system 204.

As the data stored in the two ERP systems 202, 204 is the same before the ERP system transactions are undertaken, the data stored in the test ERP system 202 is predictable by the error detector 516. The error detector 516 may control the transmitter 502 to transmit a data check request to the AS 354 of the live ERP system 204. The system tester 414 may retrieve all or part of the data stored in the live ERP system 204 and control the transmitter 402 of the AS 354 to transmit the retrieved data to the AS 304 of the test ERP system 202 for comparison with the data stored in the test system 202.

It is noted that the data stored in the live ERP system 204 and the data stored in the test ERP system 202 may be identical if no errors have occurred, but this need not be the case. In exemplary methods and apparatus, the updates and/or changes embodied in the test ERP system 202 may necessarily result in a difference between the data stored in each of the live ERP system 204 and the test ERP system 202. That is, the update itself may result in a change in data in the test ERP system 202. Any such difference in stored data between the test ERP system 202 and the live ERP system 204 is predictable by the error detector 516 based on the updates and/or changes implemented in the test ERP system 202. Similarly, the live system transaction outputs captured by the system transaction recorder 414 may be different to the outputs seen in the test system after system tester 514 has initiated the system transactions in the test system 202. The error detector 516 may be configured to determine that no error has occurred if differences between the data stored on the live database 352 and the data stored on the test database 302, and/or differences between a system transaction output in the live system 204 and a system output transaction in the test system 202, are as expected based on the updates embodied in the test ERP system 202.

Therefore, the error detector 516 may be configured to determine a predicted test system transaction output in the test system 202 based on one or more of the captured live system transaction inputs, the system copy of the live system 204 and the update that is incorporated in the test system 202. If the test system transaction output in the test system 202 matches the predicted system transaction output then the error detector 516 may determine that no errors are present.

710: If the error detector 516 detects errors then the updates and/or changes embodied in the test system 202 may be returned to the development system 200 for further work by the software engineers. In such circumstances, implementation of the updates and/or changes is prevented by the error detector 516. If no errors are detected then the updates and/or changes may be implemented in the live ERP system 204.

In exemplary methods and apparatus the system transaction recorder 414 does not continuously record data within time period, t. Rather, the system transaction recorder 414 may be configured to capture system transaction data at appropriate points during a business transaction undertaken on the live ERP system 204 to ensure that system transaction data is recorded that relates to a desired number and type of system transaction. For example, the system transaction recorder 414 may be configured to capture data when a user or a third party system, such as a website, interacts with the live ERP system 204.

Exemplary live ERP systems 204 may be high complexity and/or high volume systems. For such systems it is possible that capturing all of the system transaction inputs and outputs that are undertaken in the live ERP system 204 would add an unacceptable overhead in terms of processing. That is, it may be that the live ERP system 204 does not have the memory and/or processing capacity to capture and store every system transaction input and output that is undertaken in the live ERP system 204 without affecting the performance of the live ERP system 204 to unacceptable levels.

Therefore, the system transaction recorder 414 in the live ERP system 204 may be configured only to capture system transaction data for less than 100% of the system transactions undertaken on the live ERP system 204. The system transaction recorder 414 may be configured to capture a percentage of one or more system transaction types undertaken in the live ERP system 204.

Figure 8:
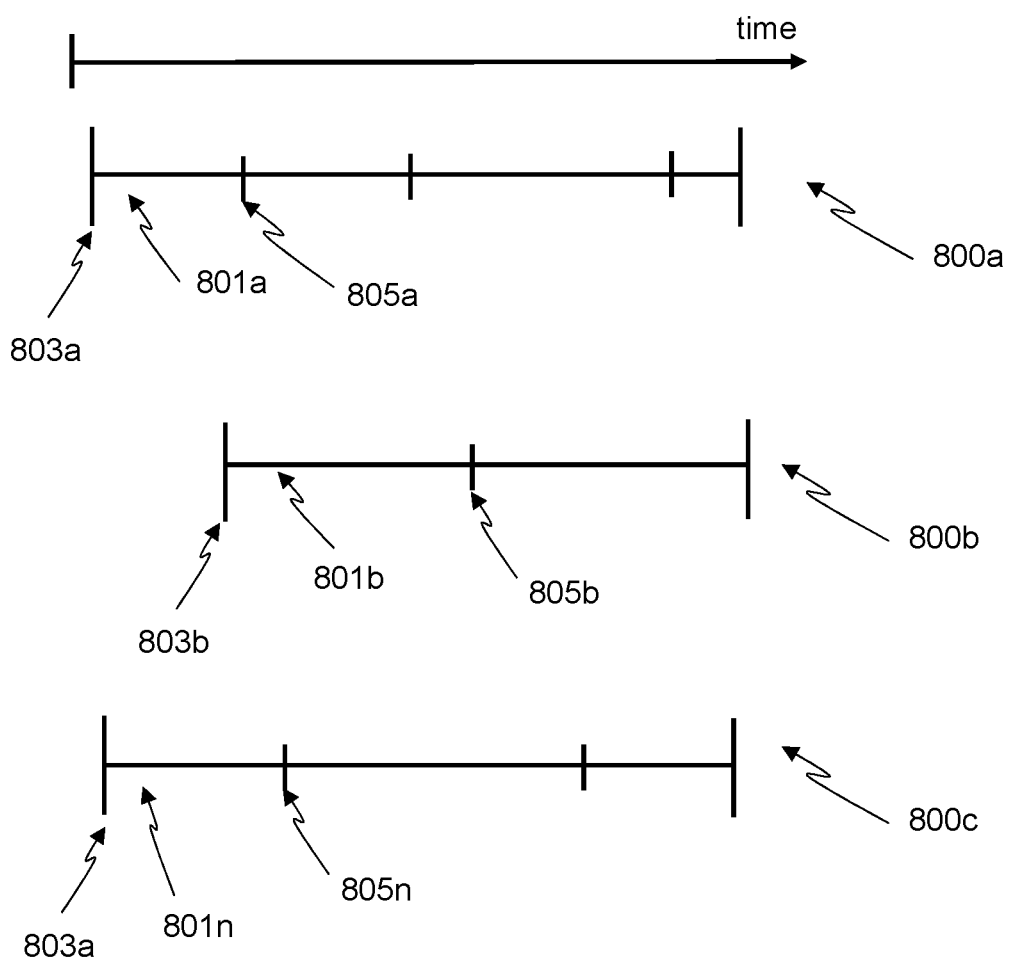
FIG. 8 shows a schematic representation of a plurality of system transactions in a live ERP system.

FIG. 8 shows a plurality of simultaneously occurring business transactions 800a-n undertaken in a live ERP system 204. Each business transaction 800a-n may comprise a plurality of system transactions 801a-n. One or more of the simultaneously occurring system transactions 801a-n may be of the same type. Each of the simultaneously occurring system transactions 801a-n may be invoked by a different user interacting with the live ERP system 204. As mentioned above, the system operations performed as part of each simultaneously occurring system transaction 801a-n may differ in number, sequence and combination even though the system transaction 801a-n are of the same type.

Although the example of FIG. 8 shows three business transactions 800a-n being undertaken in the live ERP system 204, it should be understood that in high volume or high complexity systems there may be many more (potentially thousands) of simultaneously occurring business transactions 800a-n. Because a number of system transactions occur simultaneously, a plurality of instances of one of the plurality of possible system transaction types 801a-n are likely to occur simultaneously although they are also likely to be asynchronous.

In exemplary methods and apparatus, the system transaction recorder 414 of the live ERP system AS 354 may be configured to capture a percentage of system transaction data for each system transaction type.

For example, within time period, t, there may be 20,000 system transactions of a first type undertaken by the live ERP system 204. Within time period, t, the system transaction recorder 414 may be configured to capture the inputs and outputs of 10% of the first type of system transaction undertaken and therefore captures 2,000 live system transaction inputs and 2,000 live system transaction outputs. As such, 90% of the first type of system transaction inputs and outputs are not captured.

Figure 9:
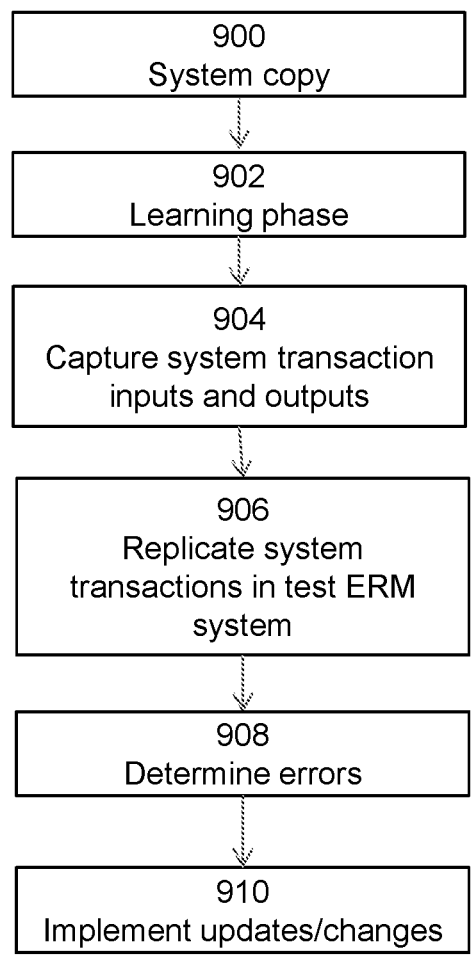
FIG. 9 shows a flow diagram of a method for testing a test ERP system.

FIG. 9 shows a flow diagram of a method for testing the test ERP system 202.

900: The system copier 412 captures a system copy of the live ERP system 204, as described above.

902: A learning phase may be undertaken by the AS 304 of the live ERP system 204.

Although in FIG. 9 the learning phase is undertaken before the system transaction recorder 414 captures data relating to the live system transaction inputs and outputs, it should be understood that the learning phase may be undertaken after the system transaction data is captured by the system transaction recorder 414. That is, the learning phase can be undertaken at any time before the replication of the system transactions in the test ERP system 202.

During the learning phase, the operation recorder 416 records all of the system operations undertaken as part of one or more system transactions undertaken in the live ERP system 204. The operation recorder 416 may control the transmitter 402 to transmit the system operations data to the test AS 304. In exemplary methods and apparatus the operation recorder 416 may be configured to capture operation data for at least one of each system transaction type undertaken by the live ERP system 204. This allows a complete model of a system transaction to be produced. Once the system operations undertaken to complete a particular system transaction are known then it is possible to implement that system transaction on the test ERP system 202. This means that where live system inputs and outputs are not captured for all system transactions (but uncaptured system transactions are logged as having happened), the system tester is able to implement those system transactions on the test ERP system by undertaking the system operations undertaken to complete the system transaction from the recorded system operation data.

By recording system operation data for the system transactions undertaken by a live ERP system 204, the impact on the production performance and the user experience on the live ERP system 204 significantly reduced. Furthermore, this near-zero production impact may be achieved without the need to make use of technologies such as shared memory (RAM).

904: The system transaction recorder 414 of the live ERP system 204 captures live system transaction inputs and outputs and controls the transmitter 402 to transmit them to the AS 304 of the test ERP system 204. The live system transaction inputs and outputs relate to a specified percentage of a total number of system transactions undertaken in the live ERP system 204 during the time period, t.

The system transaction recorder 414 may be configured to capture system transaction data relating to consecutive system transactions of the same type until the specified percentage is reached. Alternatively the system transaction recorder 414 may be configured to capture system transaction data relating to selected system transactions of the same type in order to capture data relating to different implementations of each system transaction type. As discussed above, an implementation of a system transaction type may include a different number and order of CRUD system operations.

It should be noted that although a certain percentage of live system transaction inputs and outputs are not captured, the system transaction recorder 414 may still log that these system transactions have been invoked.

In exemplary methods and apparatus, a global percentage threshold may be defined to be applied to all system transaction types. In exemplary methods and apparatus, the percentage threshold may differ between system transaction types.

906: The system tester 514 undertakes in the test ERP system the system transactions undertaken in the live ERP system 204 during the time period, t. This may be done by applying the captured live system transaction inputs captured by the system transaction recorder 414 to the corresponding system transactions of the test system 202. For those system transactions for which live system input and output data were not recorded, the system tester 514 uses the system operation data captured by the operation recorder 416, to undertake the system transactions on the test system using the recorded system operation data.

Based on the system operation data recorded by the operation recorder 416 and corresponding to a percentage of each of the total system transactions undertaken, the test ERP system 202 is able to undertake on the test ERP system 204 all of the system transactions undertaken by the live ERP system 204.

908: The error detector 516 determines whether there have been any errors in the test ERP system 202, in a similar way to that discussed above.

It is noted that in undertaking the system transactions based on the recording system operation data, the system tester 516 may introduce errors because the recorded system operation data may not be enough to determine the test system input with 100% accuracy. In specific cases, it may not be possible to determine an outcome of a read operation with 100% accuracy. This is because the system operations data may only specify that a read operation has taken place and that it has been read from a particular table in the database 352. The actual data read might not be determinable. The system tester 516 may therefore be configured to make a best guess at the data read based on the type of system transaction being extrapolated and information about other system operations in the system transaction. In such arrangements, the error detector may be configured to accept a certain amount of error, which can be attributed to this inherent inaccuracy. The amount of error may be expressed as a percentage

910: As a result of the error detection step, similar actions to those discussed above in respect of FIG. 6 may be undertaken.

Figure 10:
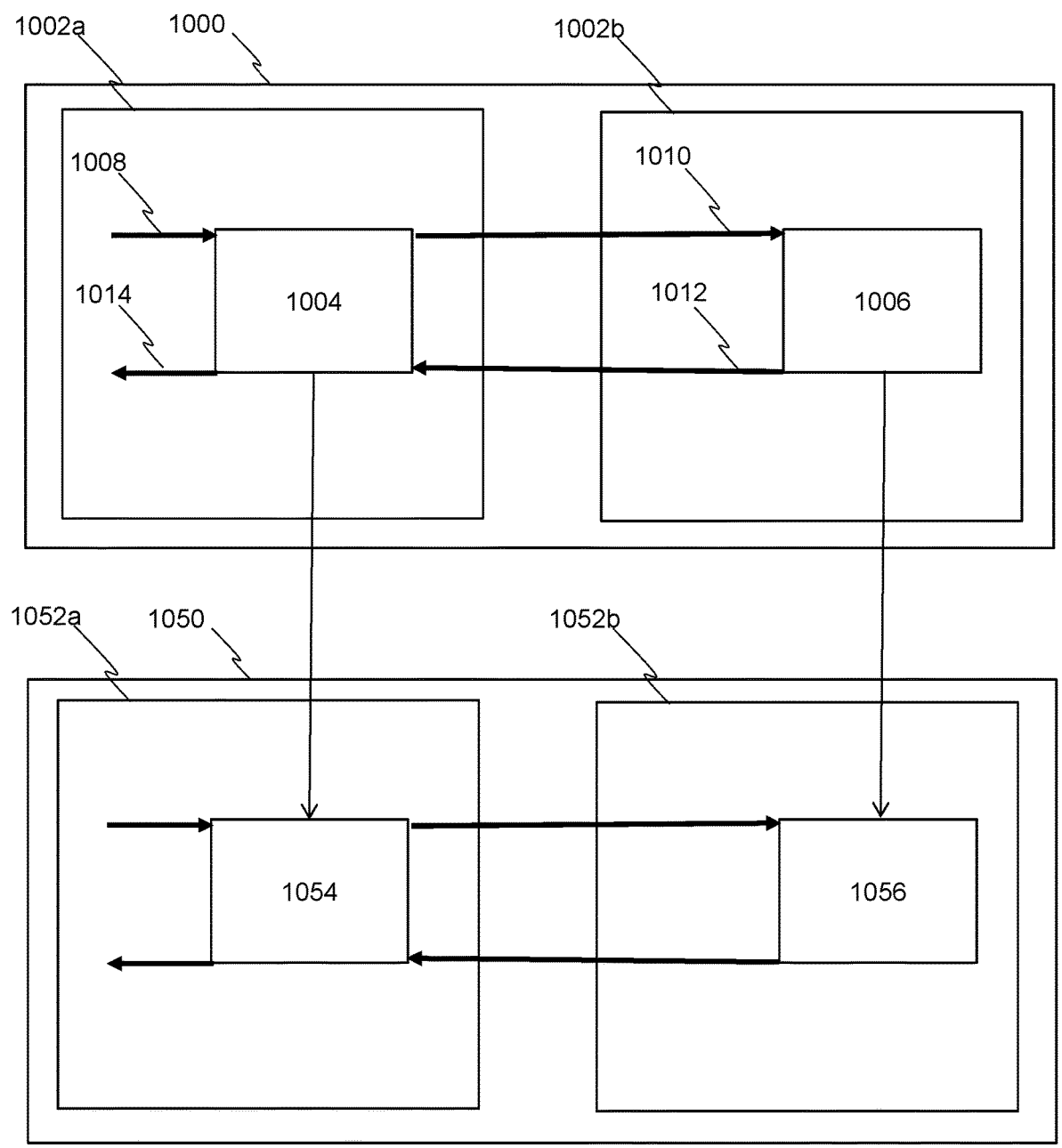
FIG. 10 is an architecture diagram showing multiple correlated live ERP systems.

FIG. 10 shows a live ERP system 1000 comprising two separate live ERP systems 1002*a-b*. Each live ERP system, 1002*a-b*, may undertake separate system transactions 1004, 1006 relating to separate business transactions. Each of the live systems 1002*a-b* may comprise one or more ASs, databases and users corresponding to the ERP systems shown in FIG. 3. The ASs of the exemplary live ERP systems 1002*a-b* may comprise the same and/or similar features to the AS of FIG. 4. The numbering in FIG. 4 is therefore used below in respect of the ASs, suffixed with an "a" or "b" accordingly.

A system transaction 1004 undertaken on the first live ERP system 1002*a* may receive an input 1008 and trigger a communication 1010 with the system transaction 1006 of the second live ERP system 1002*b*. The communication 1010 may be over a computer network, such as an internet, intranet or the Internet and may be wired, wireless or a combination of both and may be used as an input to the system transaction 1006. The system transaction 1006 produces an output 1012 that is fed back to the system transaction 1004 to produce the overall output 1014 of the system transaction 1004.

For example, a user of ERP system 1002*a* may be undertaking a business transaction that is subject to an approver limit, such as purchasing a number of items, and may need approval from ERP system 1002*b*.

Similarly, the test ERP system 1050 comprises two separate test ERP systems 1052*a-b*, which are system copies of the live ERP systems 1002*a-b* and may also incorporate an update. The test ERP systems 1052*a-b* may comprise an AS, database and plurality of users, as in FIG. 3 and the AS may comprise the same features as that in FIG. 5. The numbering in FIG. 5 is therefore used below in respect of the ASs, suffixed with an "a" or "b" accordingly.

The system transaction data for each of the plurality of live ERP systems 1002*a-b* may be recorded by the system transaction recorders 414*a-b* in the same way as described above in respect of FIGS. 7 and 9.

As such, the system transaction recorder 414*a* in the live system 1002*a* captures an output 1010 from the system transaction 1004 and in addition the system transaction recorder 414*b* of the live system 1002*b* captures an input 1010 to the system transaction 1006. It can be seen that the input/output 1010 is captured twice. Both system transaction recorders 414*a-b* control the transmitters 402*a-b* to transmit the captured system transaction data to the test ERP systems 1052*a-b*. As a result, when the captured system transaction data is replicated in the test systems 1052*a-b*, the input/output 1010 may be replicated twice and the error detectors 516*a-b* may determine false errors in the test ERP system 1004.

As such, in exemplary methods and apparatus, it is necessary to determine whether there is a correlation between individual live ERP systems 1002*a-b*. The system transaction recorder 414 may be configured to capture data specifying whether the separate live ERP systems 1002*a-b* are correlated, such that the system transaction data transmitted to the test ERP systems 1052*a-b* further comprises correlation data. The system tester 514 may be configured to prevent the application of one of the live system transaction inputs being implemented in the system transaction 1056 if the received correlation data indicates that there is a correlation. This may be done using the system logic forming part of the system copies of the live ERP systems 1002a-b.

Figure 11:
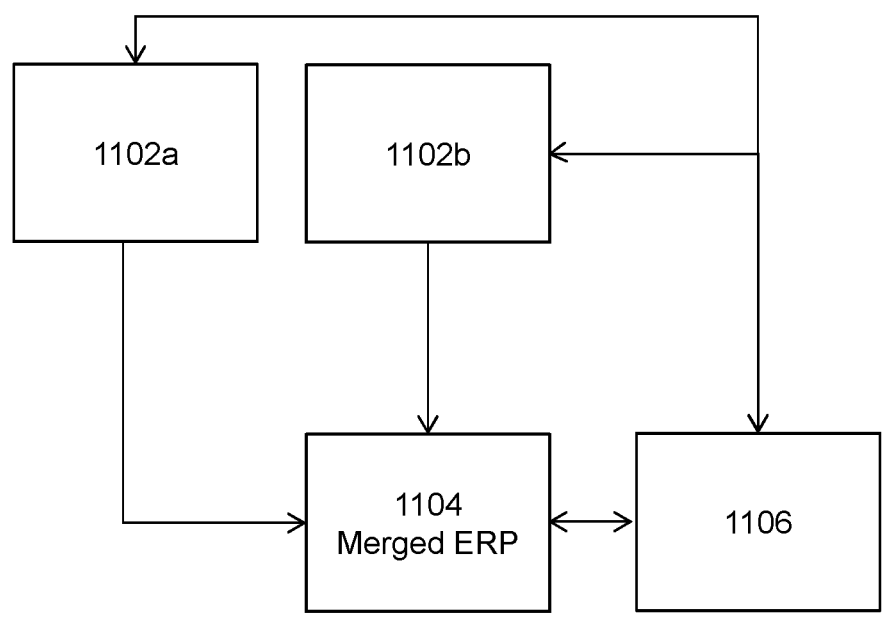
FIG. 11 is an architecture diagram showing multiple independent live ERP systems and a merged test ERP system.

FIG. 11 shows two exemplary live ERP systems 1102a-b, each configured to undertake separate system transactions. Each of the live ERP systems 1102a-b may be considered independent. The term "independent" is used to describe live ERP systems in which one or more system transactions undertaken by a first live ERP system do not directly affect one or more system transactions undertaken on a second live ERP system.

Each of the live ERP systems 1105a-b may comprise one or more ASs, databases and users as in FIG. 3 and the AS may comprise features corresponding to those of the AS 354 of FIG. 4. The numbering in FIG. 4 is therefore used in respect of the ASs, suffixed with an "a" or a "b" accordingly.

In exemplary systems, a test ERP system 1104 may be configured to test whether the plurality of independent live ERP systems, 1102a-b can be merged successfully. In exemplary methods and apparatus, the merged system 1104 may be tested by chronologically implementing the system transactions recorded by each AS in the live ERP systems 1102a-b.

The AS of the test ERP system may therefore comprise a synchroniser 1106 (shown separately in FIG. 11 for clarity). The synchroniser is configured to ensure that the system transaction data captured by each live ERP system, 1102a-b, is undertaken chronologically in the test ERP system 1104. To facilitate this, the system transaction data may be time-stamped to indicate the time at which the system transaction was undertaken in the live ERP system 1102a-b.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. An application server for use in an application layer of a test enterprise resource planning, ERP, system, the test ERP system for testing an update to live ERP system application logic, the application server comprising a copy of a live ERP system, which comprises test application logic that is a copy of the live ERP system application logic and the update, the application server comprising:
  a receiver configured to receive
    system transaction data recorded at an application layer of the live ERP system by a system transaction recorder, the application layer being in communication with a database layer of the live ERP system, the system transaction data comprising a plurality of live system transaction inputs and a plurality of live system transaction outputs for a plurality of system transactions undertaken on the live ERP system; and
    a database copy of the live ERP system, the database copy being captured by a system copier, a period of time after the system transaction recorder started to record the system transaction data;
  at least one processor coupled to the receiver;
  a system tester configured to apply the test application logic and the database copy to the plurality of live system transaction inputs to produce a plurality of system operations at a database layer of the test ERP system, the plurality of system operations comprising one or more of create, read, update and delete, CRUD, operations and configured to generate a plurality of test system transaction outputs; and an error detector configured to determine whether there has been any error in the test ERP system based on the plurality of test system transaction outputs.

2. An application server according to claim 1, wherein the error detector is configured to determine a plurality of predicted test system transaction outputs based on the plurality of live system transaction inputs and the update to the live ERP system, and to determine whether there has been any error by comparing the plurality of test system transaction outputs to the plurality of predicted test system transaction outputs.

3. An application server according to claim 1, wherein the error detector is configured to determine whether there has been any error by comparing the plurality of test system transaction outputs to the plurality of live system transaction outputs.

4. An application server according to claim 1, wherein the system transaction data comprises live system transaction inputs and live system transaction outputs for all of the system transactions undertaken on the live ERP system during a specified time period.

5. An application server according to claim 1, wherein the system transaction data further comprises correlation data indicating whether there is a correlation between the live ERP system and a further live ERP system whereby a live system transaction of the live ERP system calls a further live system transaction in the further live ERP system, the system tester being further configured not to apply the system transaction data to one of a test system transaction corresponding to the live system transaction and a further test system transaction corresponding to the further live system transaction.

6. An application server according to claim 1, wherein the application server further comprises a synchroniser configured to ensure the system transaction data recorded at the application layer is in chronological order before application by the system tester.

7. A method for operation of an application server for use in an application layer of a test enterprise resource planning, ERP, system, the test ERP system for testing an update to live ERP system application logic, the application server comprising a copy of a live ERP system, which comprises test application logic that is a copy of the live ERP system application logic and the update to the live ERP system, the method comprising:

receiving, by a receiver:
system transaction data recorded at an application layer of the live ERP system, by a system transaction recorder, the application layer being in communication with a database layer of the live ERP system, the system transaction data comprising a plurality of live system transaction inputs and a plurality of live system transaction outputs for a plurality of system transactions undertaken on the live ERP system; and a database copy of the live ERP system, the database copy being captured by a system copier, a period of time after the system transaction recorder started to record the system transaction data;

applying, by a system tester, the test application logic to the plurality of live system transaction inputs and the database copy to produce a plurality of system operations at a database layer of the test ERP system, the plurality of system operations comprising one or more of create, read, update and delete, CRUD, operations and configured to generate a plurality of test system transaction outputs; and determining, by an error detector, whether there has been any error in the test ERP system based on the plurality of test system transaction outputs.

8. A method according to claim 7, wherein the error detector determines a plurality of predicted test system transaction outputs based on the plurality of live system transaction inputs and the update to the live ERP system, and determines whether there has been any error by comparing the plurality of test system transaction outputs to the plurality of predicted test system transaction outputs.

9. A method according to claim 7, wherein the system transaction data comprises live system transaction inputs and live system transaction outputs for all of the system transactions undertaken on the live ERP system during a specified time period.

10. A method according to claim 9, wherein the receiver receives system operation data comprising system operations undertaken during one or more of the system transactions undertaken on the live ERP system, and wherein the system tester, based on the received system operation data, undertakes on the test ERP system a test system transaction for one or more live system transactions for which system transaction data has not been received.

11. An application server with at least one processor configured for use in an application layer of a live enterprise resource planning, ERP, system, the application server comprising:

a system transaction recorder configured to capture, at the application layer of the live ERP system, live system transaction data relating to a plurality of system transactions undertaken in the live ERP system, the application layer being in communication with a database layer of the live ERP system, the live system transaction data comprising a plurality of live system transaction inputs and a plurality of live system transaction outputs undertaken at the application layer of the live ERP system;

a system copier configured to capture a database copy of the live ERP system, a period of time after the system transaction recorder begins capturing the live system transaction data; and a transmitter configured to transmit the live system transaction data and the database copy to an application server in a test ERP system, the test ERP system for testing an update to live ERP system application logic, the application server of the test ERP system comprising a copy of the live ERP system, which comprises test application logic that is a copy of the live ERP system application logic and an update to the live ERP system, wherein the test application logic is applied to the live system transaction inputs to produce a plurality of system operations at a database layer of the test ERP system, the plurality of system operations comprising one or more of create, read, update and delete, CRUD, operations and configured to generate a plurality of test system transaction outputs.

12. An application server according to claim 11, wherein the system transaction data comprises live system transaction inputs and live system transaction outputs for all of the plurality of system transactions undertaken on the live ERP system during a specified time period.

13. An application server according to claim 11, wherein the system transaction recorder is further configured to capture correlation data indicating whether there is a correlation between the live ERP system and a further live ERP system whereby a live system transaction of the live ERP system calls a further live system transaction in the further live ERP system.

14. A method for operating an application server for use in an application layer of a live enterprise resource planning, ERP, system, the method comprising:
   capturing, by a system transaction recorder, at the application layer of the live ERP system, live system transaction data relating to a plurality of system transactions undertaken in the live ERP system, the application layer being in communication with a database layer of the live ERP system, the live system transaction data comprising a plurality of live system transaction inputs and a plurality of live system transaction outputs undertaken at the application layer of the live ERP system;
   capturing, by a system copier, a period of time after the system transaction recorder begins capturing the live system transaction data, a database copy of the live ERP system; and
   transmitting, by a transmitter, the live system transaction data and the database copy to an application server in a test ERP system, the test ERP system for testing an update to live ERP system application logic, the application server of the test ERP system comprising a copy of the live ERP system, which comprises test application logic that is a copy of the live ERP system application logic and an update to the live ERP system,
   wherein the test application logic is applied to the live system transaction inputs to produce a plurality of system operations at a database layer of the test ERP system, the plurality of system operations comprising one or more of create, read, update and delete, CRUD, operations and configured to generate a plurality of test system transaction outputs.

15. A method according to claim 14, wherein the live system transaction data comprises live system transaction inputs and live system transaction outputs for all of the plurality of system transactions undertaken on the live ERP system during a specified time period.

16. A method according to claim 15, further comprising capturing, by an operation recorder, operation data comprising system operations undertaken during one or more of the plurality of system transactions undertaken on the live ERP system,
   and transmitting, by the transmitter, the operation data to the application server of the test ERP system.

17. A computer program comprising instructions which, when executed on at least one processor, cause the at least one processor to carry out the method according to claim 7.

18. A carrier containing the computer program of claim 17, wherein the carrier is one of an electronic signal, optical signal, radio signal, or non-transitory computer readable storage medium.

19. An application server according to claim 1, wherein a system transaction of the plurality of system transactions is only applied in the test ERP system once a previous system transaction of the plurality of system transactions has been completed.

20. An application server according to claim 11, wherein a system transaction of the plurality of system transactions is only applied in the test ERP system once a previous system transaction of the plurality of system transactions has been completed.

* * * * *